United States Patent
Kline et al.

(10) Patent No.: US 10,809,821 B2
(45) Date of Patent: Oct. 20, 2020

(54) METHOD AND SYSTEM FOR LOCKING OF STYLUS SLOT IN VARIOUS POSITIONS

(71) Applicant: International Business Machines Corporation, Armonk, NY (US)

(72) Inventors: Eric V Kline, Rochester, MN (US); Sarbajit K Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/137,684

(22) Filed: Sep. 21, 2018

(65) Prior Publication Data

US 2020/0097101 A1 Mar. 26, 2020

(51) Int. Cl.
| | |
|---|---|
| *G06F 3/0354* | (2013.01) |
| *G06F 3/038* | (2013.01) |
| *G06F 21/32* | (2013.01) |
| *G06F 1/18* | (2006.01) |

(52) U.S. Cl.
CPC .......... *G06F 3/03545* (2013.01); *G06F 1/182* (2013.01); *G06F 3/038* (2013.01); *G06F 21/32* (2013.01)

(58) Field of Classification Search
CPC ...... G06F 3/03545; G06F 1/182; G06F 3/038; G06F 21/32
See application file for complete search history.

(56) References Cited

U.S. PATENT DOCUMENTS

| | | | |
|---|---|---|---|
| 4,488,285 A | 12/1984 | Brauer | |
| 5,434,373 A * | 7/1995 | Komaki | G06F 3/03545 178/19.01 |
| 5,545,577 A | 8/1996 | Tada | |
| 6,473,076 B1 * | 10/2002 | Thompson | G06F 1/1626 178/19.01 |
| 7,426,643 B2 | 9/2008 | Homer et al. | |
| 2003/0184529 A1 * | 10/2003 | Chien | G06F 1/1626 345/179 |
| 2010/0084202 A1 * | 4/2010 | Selin | G06F 3/03545 178/19.01 |
| 2010/0231557 A1 * | 9/2010 | Wang | G06F 1/1626 345/179 |
| 2010/0308962 A1 | 12/2010 | Li | |
| 2012/0018336 A1 * | 1/2012 | Liu | G06F 1/1656 206/488 |
| 2013/0006762 A1 | 1/2013 | Greeenberg et al. | |
| 2014/0049894 A1 | 2/2014 | Rihn et al. | |
| 2014/0253461 A1 | 9/2014 | Hicks et al. | |
| 2017/0239977 A1 * | 8/2017 | Yeh | B43K 29/00 |
| 2018/0275780 A1 * | 9/2018 | Tzou | G06F 3/03545 |

* cited by examiner

*Primary Examiner* — James Wu
*Assistant Examiner* — Hung Q Dang
(74) *Attorney, Agent, or Firm* — Cantor Colburn LLP; Tihon Poltavets

(57) ABSTRACT

An electronic device includes a device body including a stylus receiver having a first end, a second end, and an intermediate portion defining a surface. One or more locking members extend along the intermediate portion. The one or more locking members is selectively shiftable relative to the surface. A stylus is selectively positionable in the stylus receiver. The stylus includes a locking device operable to shift the one or more locking members relative to the surface releasing the stylus from the stylus receiver.

11 Claims, 5 Drawing Sheets

METHOD AND SYSTEM FOR LOCKING OF STYLUS SLOT IN VARIOUS POSITIONS

BACKGROUND

The present invention relates to electronic devices and, more specifically, to a method and system of positioning a stylus in a stylus slot of an electronic device.

Many electronic devices are adapted for use with a stylus. With the stylus, a user can perform a wide array of tasks more precisely than with, for example, a finger. The stylus may take on various forms including those that may be connected to, or stored in the electronic device. That is, certain electronic devices may include a stylus slot having a stylus retaining device that may receive and retain the stylus when not in use. Over time, the stylus retaining device wears through repeated use. When the stylus retaining device is worn to a certain point, the stylus may no longer be firmly retained in the stylus slot and may be lost.

SUMMARY

According to an exemplary embodiment, an electronic device includes a device body including a stylus receiver having a first end, a second end, and an intermediate portion defining a surface. One or more locking members extend along the intermediate portion. The one or more locking members is selectively shiftable relative to the surface. A stylus is selectively positionable in the stylus receiver. The stylus includes a locking device operable to shift the one or more locking members relative to the surface, releasing the stylus from the stylus receiver.

In accordance with another aspect of an exemplary embodiment, a method of operating an electronic device includes activating a locking device on a stylus captured in a stylus receiver of the electronic device, releasing one or more locking members arranged along the stylus receiver with the locking device, and shifting the stylus relative to the stylus receiver.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
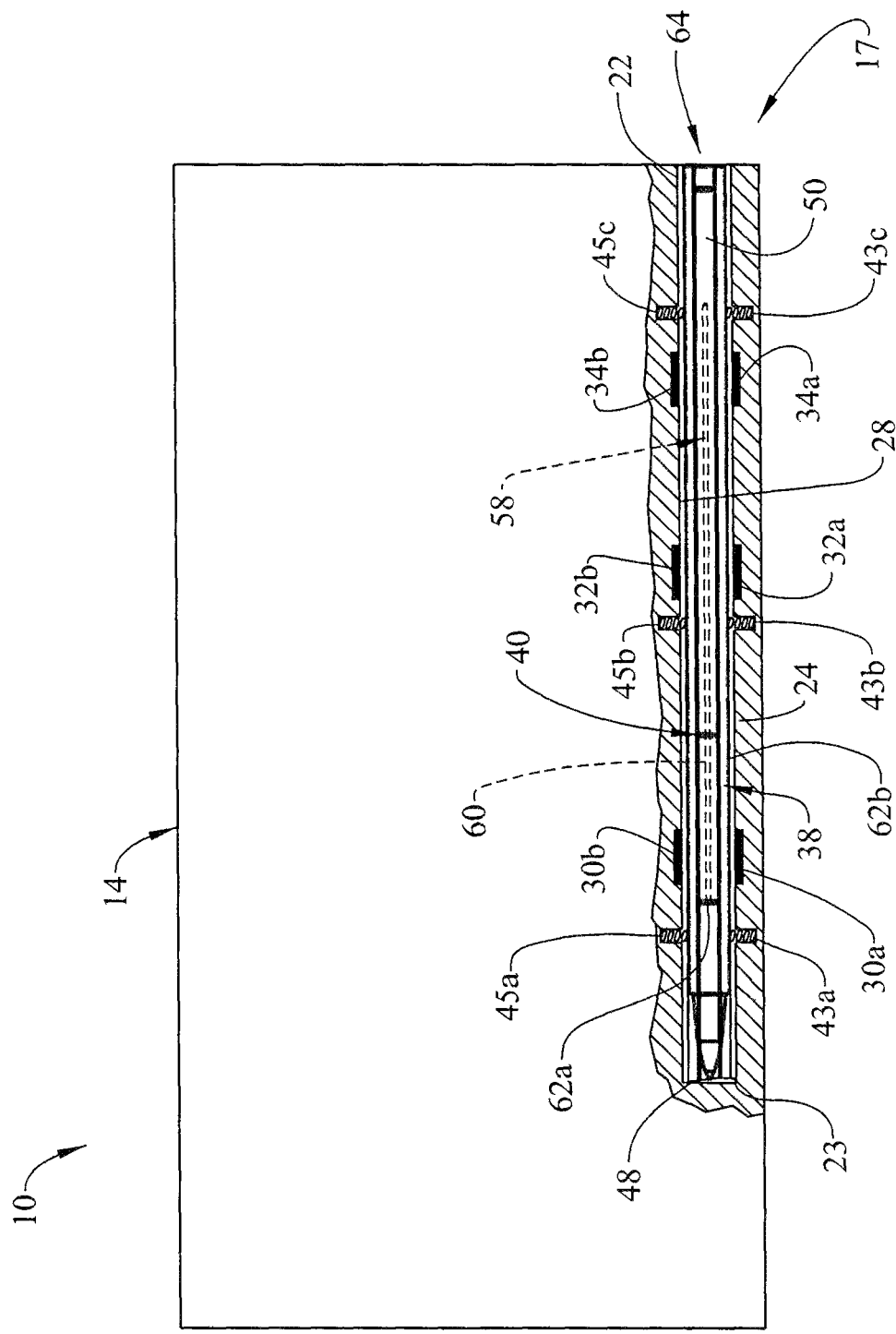
FIG. 1 depicts an electronic device having a stylus and a system for retaining the stylus in a stylus receiver, in accordance with an aspect of an exemplary embodiment.

With reference to FIG. 1, an electronic device, in accordance with an exemplary embodiment, is indicated generally at 10. Electronic device 10 includes a device body 14 having a stylus receiver 17. Stylus receiver 17 includes a first end 22, a second end 23, and an intermediate portion 24 defining a surface 28. A plurality of switch elements extend along surface 28. In the embodiment shown, the plurality of switch elements include a first pair of switch elements 30a, and 30b; a second pair of switch elements 32a, and 32b; and a third pair of switch elements 34a, and 34b. Switch elements in each pair of switch elements 30a, 30b, 32a, 32b, 34a, and 34b may work together or independently to control an aspect of electronic device 10 as will be detailed herein.

Figure 2:
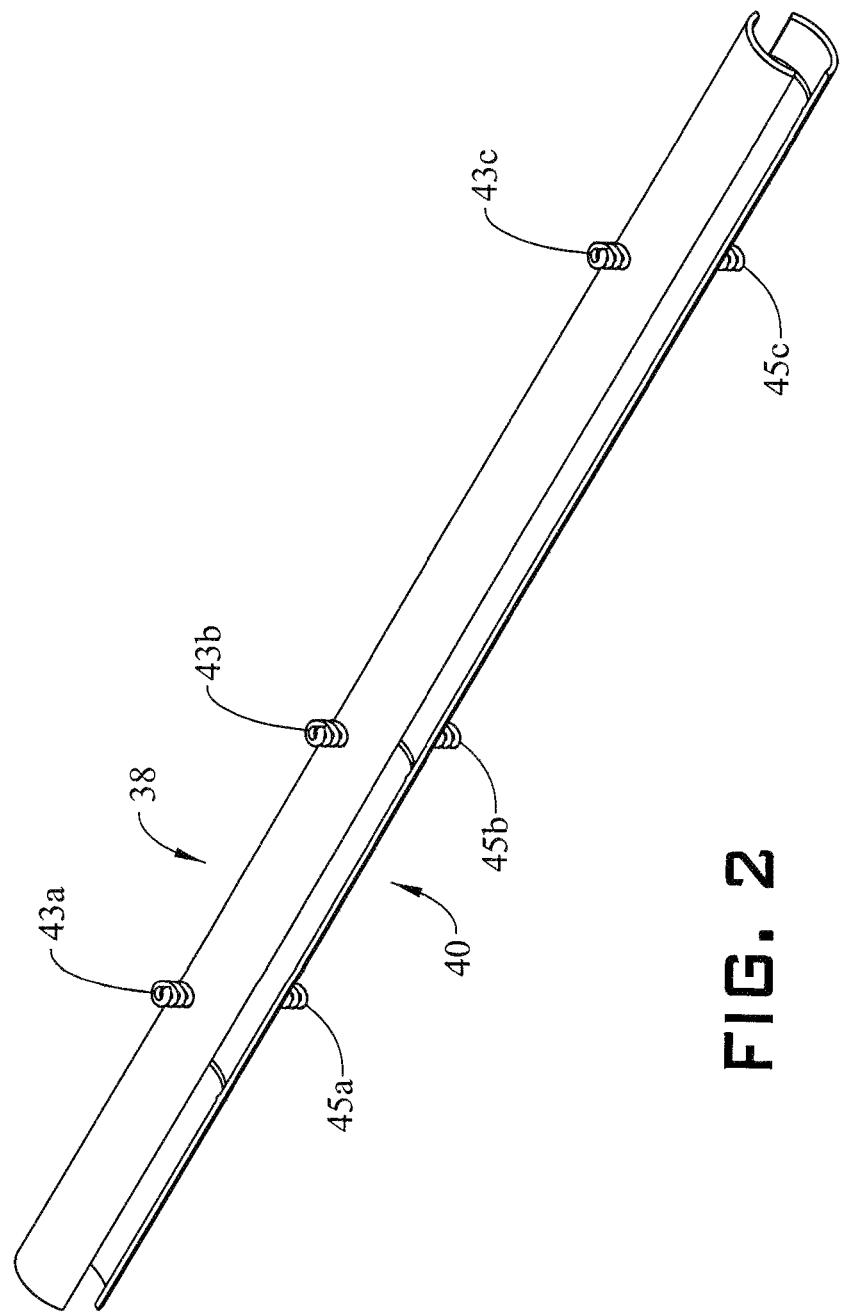
FIG. 2 depicts first and second locking members of the electronic device of FIG. 1, in accordance with an aspect of an exemplary embodiment.

Referring to FIG. 2, and with continued reference to FIG. 1, in an embodiment, stylus receiver 17 includes a first locking member 38 and a second, opposing locking member 40. First locking member 38 is resiliently biased within stylus receiver 17 through a first spring member 43a, a second spring member 43b, and a third spring member 43c. Second locking member 40 is resiliently biased within stylus receiver 17 through a first spring element 45a, a second spring element 45b, and a third spring element 45c. First and second locking members are biased radially inwardly of the stylus receiver. In an embodiment, a magnet 48 may be arranged at second end 23 of stylus receiver 17.

In accordance with an exemplary aspect, a stylus 50 is retained within stylus receiver 17 by first and second locking members 38 and 40. That is, first and second locking members 38 and 40 are biased inwardly into contact with stylus 50. First and second locking members 38 and 40 may include locking features (not separately labeled) that fixedly engage with stylus 50. Stylus 50 includes a first end section 52, a second end section 53, and an intermediate section 54 extending therebetween. Stylus 50 may house a locking device 58 which, in the embodiment shown, takes the form of a selectively activatable magnet 60. Stylus 50 is further shown to include a number of switch members, two of which are indicated at 62a and 62b that may interact with, and operate, one or more of first switch elements 30a, and 30b; second switch elements 32a, and 32b, and third switch elements 34a and 34b.

Figure 3:
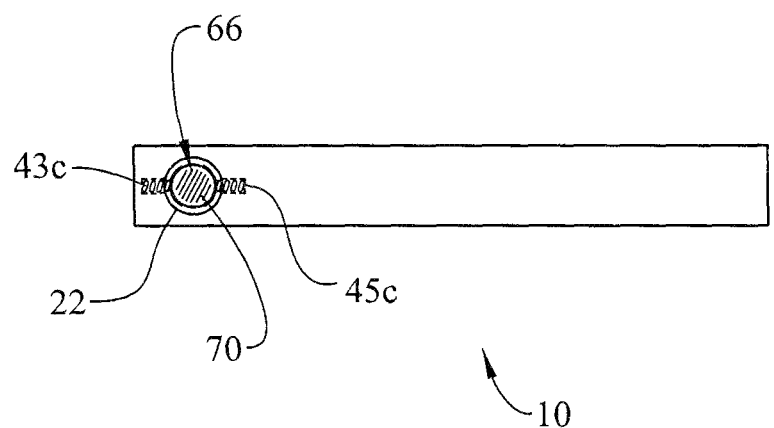
FIG. 3 depicts a biometric scanner on the stylus arranged in the electronic device of FIG. 1, in accordance with an aspect of an exemplary embodiment.

In an embodiment, stylus 50 supports a key system 64 that may be manipulated to release first and second locking members 38 and 40. Referring to FIG. 3, key system 64 may take the form of a biometric identification device 66 such as a fingerprint reader 70. Of course, it should be understood, that key system 64 may take on a variety of other forms and need not be limited to biometric readers. Key system 64 activates locking device 58. In an embodiment, key system 64 activates magnet 60 which acts to repulse or outwardly bias first and second locking members 38 and 40 thereby allowing stylus 50 to be removed from stylus receiver 17. Stylus 50 may also be positioned in one or more intermediate positions as will be detailed herein.

Figure 4:
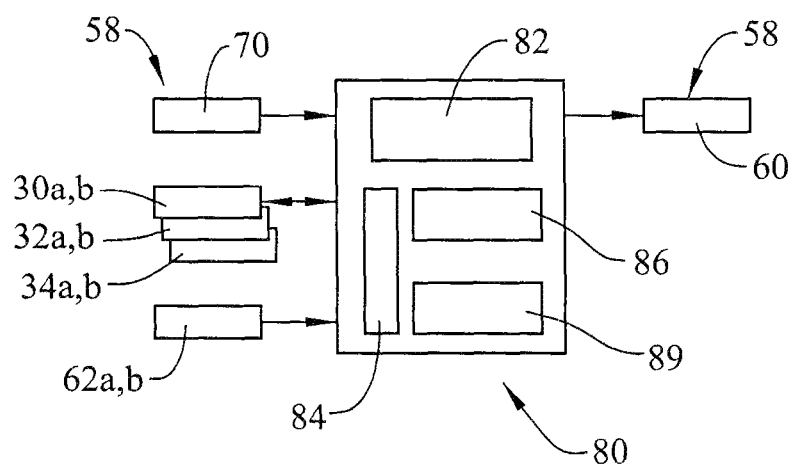
FIG. 4 depicts a block diagram illustrating a stylus retention system, in accordance with an aspect of an exemplary embodiment.

Referring to FIG. 4, electronic device 10 supports a stylus controller 80 that interfaces with stylus 50 to unlock or release first and second locking members 38 and 40. Stylus controller 80 may also serve as an interface between stylus 50 and one or more applications stored on electronic device 10. Stylus controller 80 includes a processor 82 that may take the form of a central processor unit (CPU) or graphics processor unit (GPU). Processor 82 is operatively connected to a non-volatile memory 84 having stored thereon a set of instructions associated with operating stylus 50. Stylus controller 80 may also include a locking device actuator 86 and an application launcher 89.

Figure 5:
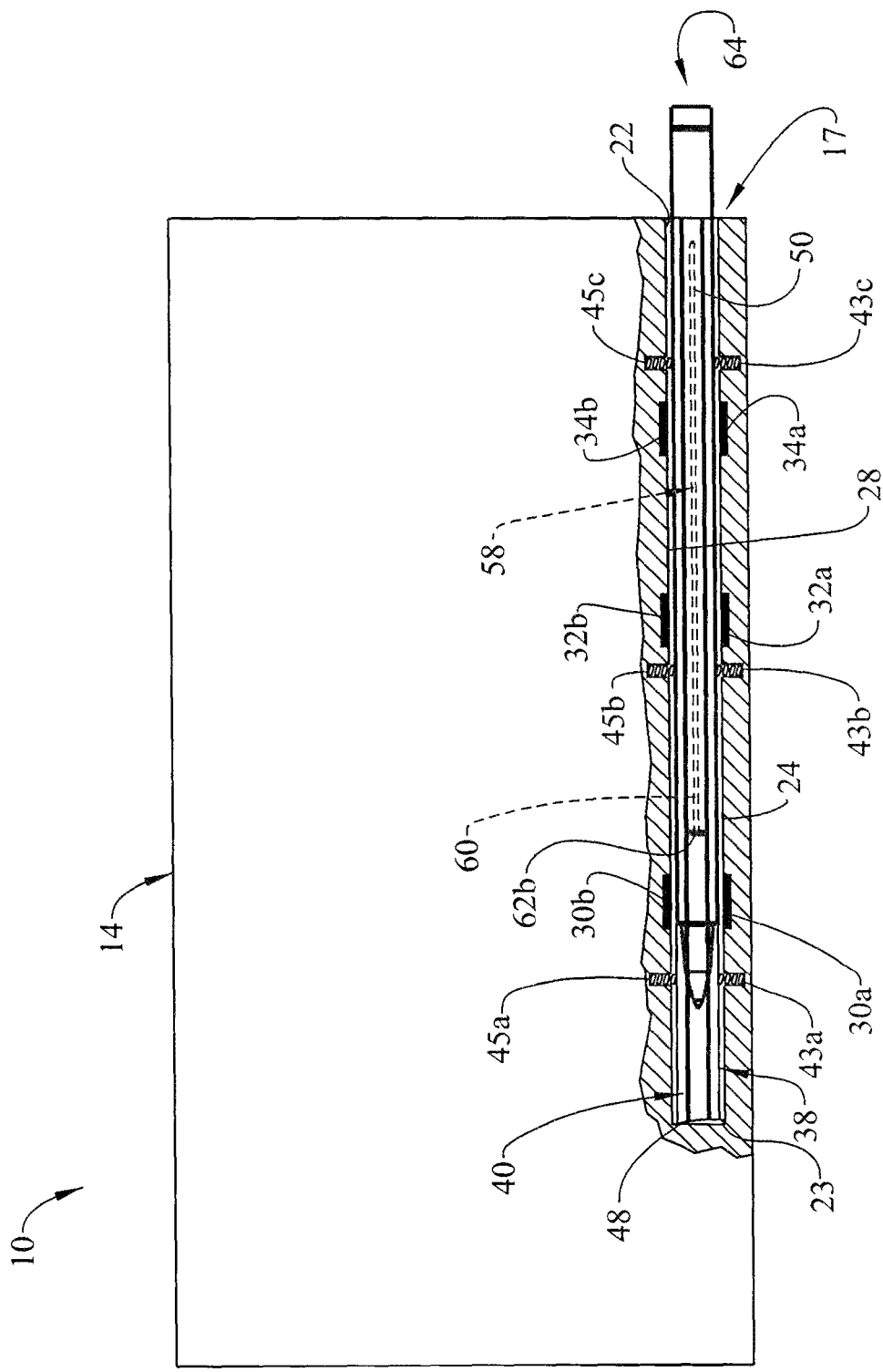
FIG. 5 depicts the electronic device of FIG. 1 depicting the stylus in a first partially extracted position, in accordance with an aspect of an exemplary embodiment.

In an embodiment, a user may unlock stylus 50 by activating key system 64. For example, the user may position a fingertip at fingerprint reader 70. Once recognized, locking device 58 may activate and repulse first and second locking members 38 and 40 allowing stylus 50 to be withdrawn from stylus receiver 17 such as shown in FIG. 5. In addition, magnet 48 may provide a magnetic force that repels stylus 50 outwardly of stylus receiver 17. Further, in FIG. 5, stylus 50 may be arranged in a first partially extracted position. The first particularly extracted position may represent an intermediate locked position such that switch member 62a aligns with switch elements 30a and 30b. In this configuration, the user may manipulate stylus 50, such as by rotating through one or more discrete rotational positions or interacting with a button (not shown) to signal application launcher 89 to launch or control an application on electronic device 10.

Figure 6:
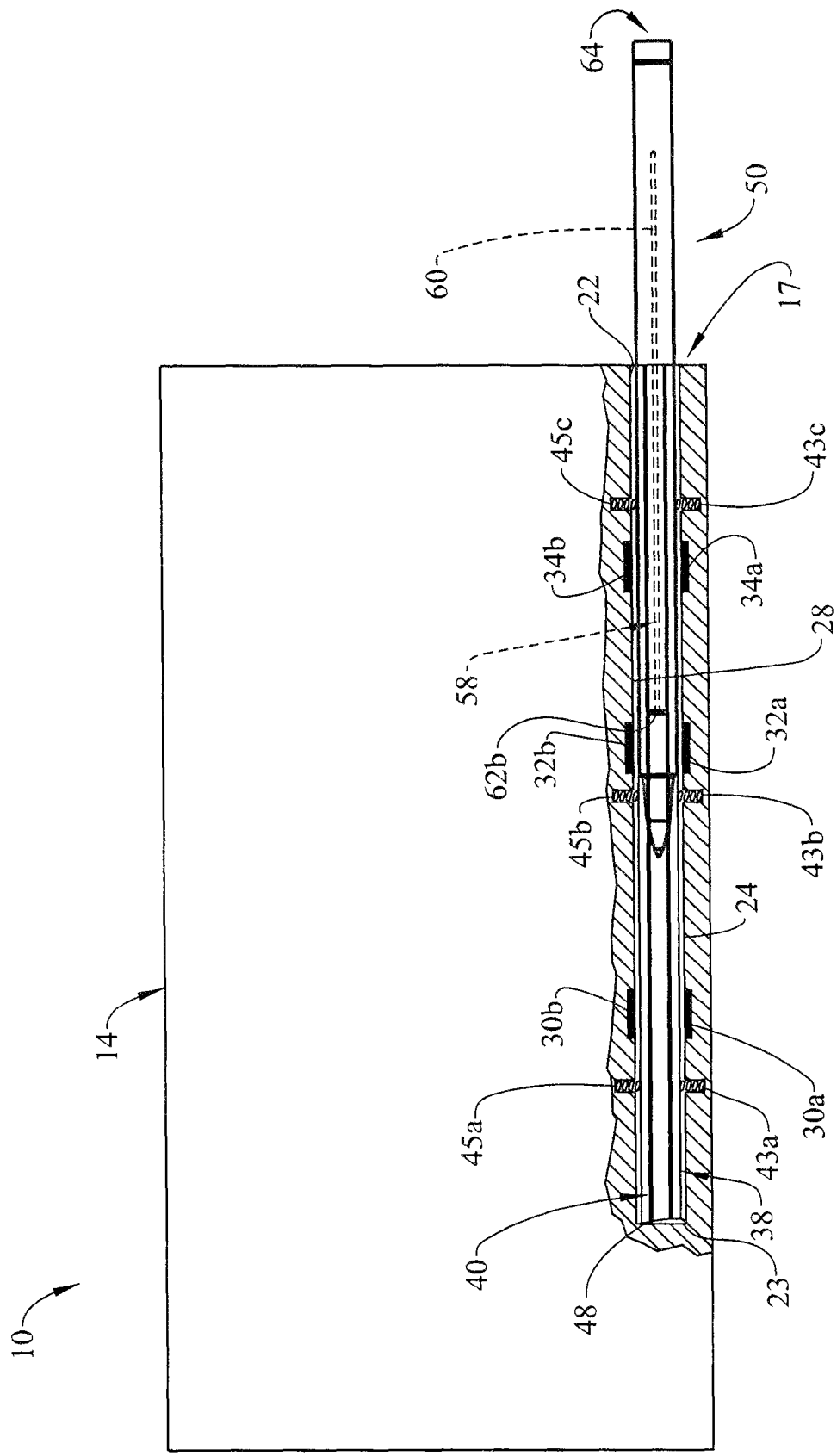
FIG. 6 depicts the electronic device of FIG. 1 depicting the stylus in a second partially extracted position, in accordance with an aspect of an exemplary embodiment.

In FIG. 6, stylus 50 may be arranged in a second, partially extracted position that could take the form of another intermediate locked position. In the second partially locked position, switch member 62a may be aligned with switch element 32a and switch element 32b. Also, switch member 62b may be aligned with switch element 34a and switch element 34b. In this configuration, the user may manipulate stylus 50, such as by rotating through one or more discrete rotational positions or interacting with a button (not shown) to signal application launcher 89 to launch or control additional applications on electronic device 10. At this point, it should be understood that the number of discrete rotational positions and the number of partially extracted positions may vary. It should also be understood that the number of switch members and switch elements may vary.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment of the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An electronic device comprising:
    a device body including a stylus receiver having first end, a second end, and an intermediate portion defining a surface;
    one or more locking members resiliently mounted to the surface of the device body within the stylus receiver through one or more spring members, the one or more locking members extending along the intermediate portion and being selectively radially shiftable relative to the surface; and
    a stylus selectively positionable in the stylus receiver, the stylus including an unlocking device including a selectively activatable magnet that is operable to repel the one or more locking members away from the stylus toward the surface releasing the stylus from the stylus receiver.

2. The electronic device according to claim 1, further comprising a key system operable to activate the unlocking device.

3. The electronic device according to claim 2, wherein the key system comprises a biometric identification device.

4. The electronic device according to claim 3, wherein the biometric identification device comprises a fingerprint reader.

5. The electronic device according to claim 1, further comprising: a magnet arranged at the second end of the stylus receiver.

6. A method of operating an electronic device comprising:
    activating an unlocking device by turning on a magnet on a stylus captured in a stylus receiver of the electronic device;
    repelling one or more locking members resiliently connected to the electronic device and arranged along the stylus receiver with the unlocking device away from the stylus; and
    shifting the stylus relative to the stylus receiver.

7. The method of claim 6, wherein shifting the stylus relative to the stylus receiver includes removing the stylus from the electronic device.

8. The method of claim 6, wherein shifting the stylus relative to the stylus receiving includes shifting the stylus from a first locked position to a second locked position.

9. The method of claim 8, wherein rotating the stylus in the stylus receiver includes placing the stylus in one or more discrete rotational positions defined at the second locked position.

10. The method of claim 6, further comprising: ejecting the stylus from the stylus receiver.

11. The method of claim 10, wherein ejecting the stylus from the stylus receiver includes repelling the stylus from the stylus receiver with a magnetic force from the electronic device.

\* \* \* \* \*